United States Patent
Tentorio et al.

(10) Patent No.: US 11,339,970 B1
(45) Date of Patent: *May 24, 2022

(54) COMBUSTOR WITH IMPROVED AERODYNAMICS

(71) Applicants: ROLLS-ROYCE PLC, London (GB); ROLLS-ROYCE DEUTSCHLAND LTD & CO KG, Dahlewitz (DE)

(72) Inventors: Luca Tentorio, Derby (GB); Imon-Kalyan Bagchi, Berlin (DE)

(73) Assignees: ROLLS-ROYCE PLC, London (GB); ROLLS-ROYCE DEUTSCHLAND LTD & CO KG, Dahlewitz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/380,264

(22) Filed: Jul. 20, 2021

(30) Foreign Application Priority Data

Dec. 7, 2020 (GB) ...................................... 2019222

(51) Int. Cl.
    *F23R 3/34* (2006.01)
    *F23R 3/14* (2006.01)
    *F02C 7/36* (2006.01)

(52) U.S. Cl.
    CPC ................ *F23R 3/343* (2013.01); *F23R 3/14* (2013.01); *F02C 7/36* (2013.01); *F05D 2270/07* (2013.01); *F05D 2270/082* (2013.01)

(58) Field of Classification Search
    CPC .... F23R 3/343; F23R 3/14; F23R 3/28; F23R 3/283; F23R 3/286; F23R 3/34; F23D 11/383

See application file for complete search history.

(56) References Cited

U.S. PATENT DOCUMENTS

| | | |
|---|---|---|
| 3,905,192 A | 9/1975 | Pierce et al. |
| 4,265,615 A | 5/1981 | Lohmann et al. |
| 4,721,454 A | 1/1988 | Schirmer et al. |

(Continued)

FOREIGN PATENT DOCUMENTS

CN      113477190 A      10/2021

OTHER PUBLICATIONS

R. Ciardiello et al., "Experimental assessment of the lean blow-off in a fully premixed annular combustor", Experimental Thermal and Fluid Science, vol. 112, https://doi.org/10.1016/j.expthermflusci.2019.109994 (Nov. 2019).

*Primary Examiner* — Craig Kim
(74) *Attorney, Agent, or Firm* — Oliff PLC

(57) ABSTRACT

A lean burn combustor includes a plurality of lean burn fuel injectors, each including a fuel feed arm and a lean burn fuel injector head with a lean burn fuel injector head tip, wherein the lean burn fuel injector head tip has a lean burn fuel injector head tip diameter, the lean burn fuel injector head including a pilot fuel injector and a main fuel injector, the main fuel injector being arranged coaxially and radially outwards of the pilot fuel injector; and a combustor chamber extending along an axial direction for a length and including a radially inner annular wall, a radially outer annular wall, and a meter panel defining the size and shape of the combustor chamber, wherein the combustor chamber includes primary and secondary combustion zones. A ratio of the combustor chamber length to the lean burn fuel injector head tip diameter is less than 5.

20 Claims, 3 Drawing Sheets

(56) References Cited

U.S. PATENT DOCUMENTS

| | | |
|---|---|---|
| 5,335,502 A | 8/1994 | Roberts, Jr. et al. |
| 5,406,799 A | 4/1995 | Marshall |
| 6,237,343 B1 | 5/2001 | Butler |
| 6,272,840 B1 | 8/2001 | Crocker et al. |
| 6,698,206 B2 | 3/2004 | Scarinci et al. |
| 7,954,325 B2 | 6/2011 | Burd et al. |
| 8,443,610 B2 | 5/2013 | Hoke et al. |
| 8,646,275 B2 | 2/2014 | Rackwitz et al. |
| 8,646,279 B2 | 2/2014 | Schreiber et al. |
| 9,366,442 B2 * | 6/2016 | Matsuyama ............ F23R 3/286 |
| 9,664,391 B2 | 5/2017 | Kobayashi et al. |
| 9,765,969 B2 | 9/2017 | Graves et al. |
| 10,837,640 B2 * | 11/2020 | Patel ...................... F23R 3/283 |
| 2007/0074518 A1 | 4/2007 | Rogers et al. |
| 2007/0125093 A1 | 6/2007 | Burd et al. |
| 2008/0178597 A1 | 7/2008 | Cayre et al. |
| 2009/0139240 A1 | 6/2009 | Rackwitz et al. |
| 2011/0120134 A1 * | 5/2011 | Hoke ....................... F23R 3/06 60/754 |
| 2011/0271678 A1 | 11/2011 | Bourgois et al. |
| 2012/0151930 A1 * | 6/2012 | Patel ...................... F23R 3/283 60/746 |
| 2012/0186256 A1 * | 7/2012 | Dai ......................... F23R 3/286 60/737 |
| 2012/0186264 A1 | 7/2012 | Hoke |
| 2012/0234013 A1 * | 9/2012 | Overman ............... F23R 3/343 60/772 |
| 2012/0304658 A1 | 12/2012 | Schreiber et al. |
| 2012/0305673 A1 | 12/2012 | Matsuyama et al. |
| 2014/0007583 A1 | 1/2014 | Harding |
| 2014/0083105 A1 * | 3/2014 | Kobayashi ............... F23R 3/28 60/746 |
| 2014/0360202 A1 * | 12/2014 | Toon ...................... F23R 3/343 60/776 |
| 2015/0040576 A1 | 2/2015 | Graves et al. |
| 2016/0245522 A1 | 8/2016 | Dai et al. |
| 2017/0067635 A1 * | 3/2017 | Zong ....................... F23R 3/54 |
| 2017/0268782 A1 | 9/2017 | Huang et al. |
| 2017/0284422 A1 | 10/2017 | Stieger |
| 2018/0128489 A1 * | 5/2018 | Boardman .............. F23R 3/286 |
| 2019/0093893 A1 | 3/2019 | Clemen et al. |
| 2019/0271470 A1 * | 9/2019 | Boardman .............. F23R 3/283 |
| 2019/0316776 A1 | 10/2019 | Tentorio |
| 2021/0123600 A1 * | 4/2021 | Nemitallah ............... F02C 3/34 |

\* cited by examiner

COMBUSTOR WITH IMPROVED AERODYNAMICS

CROSS-REFERENCE TO RELATED APPLICATIONS

This specification is based upon and claims the benefit of priority from UK Patent Application Number 2019222.5 filed on Dec. 7, 2020, the entire contents of which are incorporated herein by reference.

BACKGROUND

1. Field of the Disclosure

The present disclosure relates to combustion equipment, and in particular to lean burn combustors for gas turbine engines for aircraft, industrial, and marine applications.

2. Description of the Related Art

A gas turbine engine for aircraft applications typically comprises, in axial flow arrangement, a fan, one or more compressors, a combustion system and one or more turbines. The combustion system typically comprises a plurality of fuel injectors having fuel spray nozzles which combine fuel and air flows and generate sprays of atomised liquid fuel into a combustion chamber. The mixture of air and atomised liquid fuel is then combusted in the combustion chamber and the resultant hot combustion products then expand through, and thereby drive, the one or more turbines.

There is a continual need to reduce the environmental impact of gas turbine engines in terms of carbon emissions and nitrous oxides (NOx), which begin forming at high temperatures and increase exponentially with increasing temperature.

In order to address the NOx emission issue, the "lean burn" combustion technology has been proposed. In lean burn combustion the air-to-fuel ratio (AFR) is higher than a stoichiometric ratio, which allows to keep the combustion temperature within limits known to reduce NOx production.

On the other hand, keeping the combustion temperature relatively low could lead to incomplete or weak combustion, which in turn may lead to producing other pollutants, such as carbon monoxide (CO) and unburned hydrocarbons (UHC), and/or flame instability and rumble, which in turn may cause fatigue failure of components in the engine and/or passenger discomfort, depending on the frequency of the rumbling.

Gas turbine engines for industrial and marine applications face similar challenges as gas turbine engines for aircraft applications.

There is therefore a need to provide a lean burn combustion system for aircraft, industrial, and marine engines which allows to reduce engine emissions of NOx, as well as CO and UHC, and improve engine operability.

SUMMARY

According to a first aspect, there is provided a lean burn combustor comprising: a plurality of lean burn fuel injectors, each comprising a fuel feed arm and a lean burn fuel injector head with a lean burn fuel injector head tip, wherein the lean burn fuel injector head tip has a lean burn fuel injector head tip diameter (d), the lean burn fuel injector head comprising a pilot fuel injector and a main fuel injector, the main fuel injector being arranged coaxially and radially outwards of the pilot fuel injector; and a combustor chamber extending along an axial direction and comprising a radially inner annular wall, a radially outer annular wall, and a meter panel provided upstream of the radially inner and radially outer annular walls with a plurality of apertures adapted for accommodating the lean burn fuel injector head tips. The radially inner annular wall, the radially outer annular wall, and the meter panel define the size and shape of the combustor chamber, wherein the combustor chamber has a combustor chamber length (L) and comprises a primary combustion zone with a primary combustion zone length (Z) and a primary combustion zone depth (D), and a secondary combustion zone with a secondary combustion zone length (L-Z) arranged downstream of the primary combustion zone. According to the first aspect, a ratio L/d of the combustor chamber length to the lean burn fuel injector head tip diameter is less than 5.

In the present disclosure, upstream and downstream are with respect to the fuel and air flow through the combustor, and front and rear is with respect to the lean burn combustor, i.e. the lean burn fuel injectors being in the front and the combustor chamber being in the rear.

The present inventors have found a unique non-dimensional parameter combination for the combustor chamber that allows combustor aerodynamics developing to optimise combustion efficiency and minimise NOX and Smoke. The lean burn combustor according to the disclosure allows for a so-called S-shaped recirculation zone to form in the primary combustion zone of the combustor chamber, which allows the pilot fuel nozzle to support the main fuel nozzle combustion. In particular, the present inventors have found that a combustor chamber according to the disclosure allows the burning mixture of pilot fuel and air coming from the pilot fuel injector to form an S-shaped flow recirculation. In detail, the burning mixture of pilot fuel and air coming from the pilot fuel injector may arrive at a stagnation point in the primary combustion zone, where the pilot fuel and air mixture local velocity is zero, go backwards towards the lean burn fuel injectors, and be diverted (due to low static pressure in the main flow stream) towards the radially inner and radially outer annular walls of the combustor chamber to join the burning mixture of main fuel and air coming from the main fuel injector and support the combustion thereof. In other words, the burning mixture of pilot fuel and air coming from the pilot fuel injector may flow along an S-shaped trajectory.

The skilled person would appreciate that when designing a combustor chamber for a lean burn combustor, aerodynamics study have to be carried out for any combustor chamber size in order to optimise the fuel and air mixture aerodynamics and combustion. The present inventors have surprisingly found that a lean burn combustor according to the disclosure can be scaled up and down without affecting the combustion efficiency. In other words, as the ratio L/d is non-dimensional, for a wide size range of the combustor chamber of the lean burn combustor according to the disclosure, the S-shaped recirculation zone can be effectively and efficiently formed within the primary combustion zone. For example, a lean burn combustor according to the disclosure may be sized for engines adapted to be mounted on small, medium, and large aircrafts.

In embodiments, the ratio L/d of the combustor chamber length L to the lean burn fuel injector head tip diameter d may be less than 4.5, for example less than 4, or less than 3.5, or less than 3, or less than 2.8, or less than 2.6, or less than 2.5, or less than 2.45, or less than 2.4. The ratio L/d of the combustor chamber length L to the lean burn fuel injector head tip diameter d may be greater than 1.7, or greater than 1.8, or greater than 1.85, or greater than 1.9, or greater than 2.0.

The lean burn fuel injector head may generally extend along a longitudinal direction, the longitudinal direction forming a cant angle $\alpha_{cant}$ with the axial direction, the cant angle $\alpha_{cant}$ being comprised between 0° and 10°.

The combustor chamber may extend axially between the meter panel (upstream) and an annular outlet (downstream), through which the combusted gas exits the combustor chamber. The annular outlet may be defined by, and between, the radially inner annular wall and the radially outer annular wall of the combustor chamber. In the present disclosure the combustor chamber length (L) may be defined as an axial distance between the meter panel and the annular outlet.

The radially outer annular wall may extend substantially axially between the meter panel and the annular outlet. In embodiments, the radially outer annular wall may form an outer angle $\alpha_{outer}$ with the axial direction, the outer angle $\alpha_{outer}$ being comprised between 0° and 15°, for example between 0° and 12°, or between 0° and 10°, or between 3° and 15°, or between 5° and 15°.

The radially outer annular wall may comprise a first part and a second part. The first part of the radially outer annular wall may be arranged upstream of the second part of the radially outer annular wall. The first part and the second part of the radially outer annular wall may be mutually aligned.

The radially inner annular wall may comprise a first part and a second part. The first part of the radially inner annular wall may be arranged upstream of the second part of the radially inner annular wall. The first part of the radially inner annular wall may be connected to the meter panel. The second part of the radially inner annular wall and the second part of the radially outer annular wall may define the annular outlet of the combustion chamber. The first part of the radially inner annular wall may be arranged at an angle to the second part of the radially inner annular wall. The first part of the radially inner annular wall may be parallel to the radially outer annular wall. The first part of the radially inner annular wall may be parallel to the axial direction.

The first part of the radially inner annular wall, the first part of the radially outer annular wall, and the meter panel define the primary combustion zone.

In the present disclosure the primary combustion zone length (Z) may be defined as axial length of the primary combustion zone. The first part of the radially inner annular wall may define the primary combustion zone length (Z). The first part of the radially outer annular wall may define the primary combustion zone length (Z). The first part of the radially inner annular wall and the first part of the radially outer annular wall may have the same length along the axial direction.

In the present disclosure the primary combustion zone depth (D) may be defined as radial distance between the first part of the radially inner annular wall and the first part of the radially outer annular wall. The term "radial" as used herein may refer to the direction perpendicular to the first part of the radially inner annular wall and the first part of the radially outer annular wall.

The second part of the radially inner annular wall may be convergent towards the second part of the radially outer annular wall in a downstream direction. In embodiments, the second part of the radially inner annular wall may form an inner angle $\alpha_{inner}$ with the first part of the radially inner annular wall, the inner angle $\alpha_{inner}$ being comprised between 15° and 50°, for example between 15° and 45°, or between 15° and 40°, or between 20° and 50°, or between 25° and 50°, or between 25° and 45°, or between 25° and 40°.

The second part of the radially inner annular wall and the second part of the radially outer annular wall may define the secondary combustion zone. The secondary combustion zone may extend between the primary combustion zone and the annular outlet of the combustion chamber. The secondary combustion zone is arranged downstream of the primary combustion zone. The secondary combustion zone extends for the secondary combustion zone length (L-Z). The second part of the radially outer annular wall may extend for a length equal to the secondary combustion zone length (L-Z). The second part of the radially inner annular wall may extend for a length equal to $(L-Z)/\cos(\alpha_{inner})$.

Respective inner surfaces of the radially inner annular wall, radially outer annular wall, and meter panel may define the size and shape of the combustion chamber where combustion occurs. In some literature, the radially inner annular wall, radially outer annular wall, and meter panel are referred to as combustion liners. In embodiments, the radially inner annular wall, radially outer annular wall, and meter panel may each comprise respective tiles. The tiles may define the respective inner surfaces of the radially inner annular wall, radially outer annular wall, and meter panel, and therefore define the size and shape of the combustor chamber where combustion occurs. The tiles, or in other words the inner surfaces of the radially inner annular wall, radially outer annular wall, and meter panel may face the combustion process within the combustion chamber and may be in contact with the fuel and air mixture, and/or the combustion gases.

The inventors of the present disclosure have also found that other non-dimensional parameters may be advantageous when designing a combustor chamber for a lean burn combustor with improved combustion efficiency.

In embodiments, a ratio L/D of the combustor chamber length L to the primary combustion zone depth D may be less than 2.0, for example less than 1.9, or less than 1.8, or less than 1.75, or less than 1.70, or less than 1.65, or less than 1.60. The ratio L/D of the combustor chamber length L to the primary combustion zone depth D may be greater than 1.0, for example greater than 1.05, or greater than 1.10, or greater than 1.15, or greater than 1.20, or greater than 1.25.

In embodiments, a ratio D/d of the primary zone depth D to the lean burn fuel injector head tip diameter d may be less than 2.4, for example less than 2.3, or less than 2.2, or less than 2.1, or less than 2.0. The ratio D/d of the primary combustion zone depth D to the lean burn fuel injector head tip diameter d may be greater than 1.2, for example greater than 1.3, or greater than 1.4, or greater than 1.5.

In embodiments, a ratio Z/d of the primary combustion zone length Z to the lean burn fuel injector head tip diameter d may be less than 1.40, for example less than 1.35, or less than 1.30, or less than 1.25, or less than 1.20. The ratio Z/d of the primary combustion zone length Z to the lean burn fuel injector head tip diameter d may be greater than 0.70, for example greater than 0.75, or greater than 0.80, or greater than 0.85, or greater than 0.90.

The skilled person would appreciate that, as the ratios L/D of the combustor chamber length L to the primary combustion zone depth D, D/d of the primary zone depth D to the lean burn fuel injector head tip diameter d, and Z/d of the primary combustion zone length Z to the lean burn fuel injector head tip diameter d, are all non-dimensional, they all may apply to lean burn combustors, and relative combustor chambers, of a wide size range and may contribute to form the S-shaped recirculation zone within the primary combustion zone.

According to a second aspect, there is provided a lean burn combustor comprising: a plurality of lean burn fuel injectors, each comprising a fuel feed arm and a lean burn fuel injector head with a lean burn fuel injector head tip, wherein the lean burn fuel injector head tip has a lean burn fuel injector head tip diameter (d), the lean burn fuel injector head comprising a pilot fuel injector and a main fuel injector, the main fuel injector being arranged coaxially and radially outwards of the pilot fuel injector; and a combustor chamber extending along an axial direction and comprising a radially inner annular wall, a radially outer annular wall, and a meter panel provided upstream of the radially inner and radially outer annular walls with a plurality of apertures adapted for accommodating the lean burn fuel injector head tips. The radially inner annular wall, the radially outer annular wall, and the meter panel define the size and shape of the combustor chamber, wherein the combustor chamber has a combustor chamber length (L) and comprises a primary combustion zone with a primary combustion zone length (Z) and a primary combustion zone depth (D), and a secondary combustion zone with a secondary combustion zone length (L-Z) arranged downstream of the primary combustion zone. According to the second aspect, a ratio L/D of the combustor chamber length to the primary combustion zone depth is less than 2.0.

In embodiments, the ratio L/D of the combustor chamber length L to the primary combustion zone depth D may be less than 1.9, for example less than 1.8, or less than 1.75, or less than 1.70, or less than 1.65, or less than 1.60. The ratio L/D of the combustor chamber length L to the primary combustion zone depth D may be greater than 1.0, for example greater than 1.05, or greater than 1.10, or greater than 1.15, or greater than 1.20, or greater than 1.25.

In embodiments, a ratio L/d of the combustor chamber length L to the lean burn fuel injector head tip diameter d may be less than 5, for example less than 4.5, or less than 4, or less than 3.5, or less than 3, or less than 2.8, or less than 2.6, or less than 2.5, or less than 2.45, or less than 2.4. The ratio L/d of the combustor chamber length L to the lean burn fuel injector head tip diameter d may be greater than 1.8, for example greater than 1.85, or greater than 1.9, or greater than 2.0.

In embodiments, a ratio D/d of the primary zone depth D to the lean burn fuel injector head tip diameter d may be less than 2.4, for example less than 2.3, or less than 2.2, or less than 2.1, or less than 2.0. The ratio D/d of the primary combustion zone depth D to the lean burn fuel injector head tip diameter d may be greater than 1.2, for example greater than 1.3, or greater than 1.4, or greater than 1.5.

In embodiments, a ratio Z/d of the primary combustion zone length Z to the lean burn fuel injector head tip diameter d may be less than 1.40, for example less than 1.35, or less than 1.30, or less than 1.25, or less than 1.20. The ratio Z/d of the primary combustion zone length Z to the lean burn fuel injector head tip diameter d may be greater than 0.70, for example greater than 0.75, or greater than 0.80, or greater than 0.85, or greater than 0.90.

According to a third aspect, there is provided a lean burn combustor comprising: a plurality of lean burn fuel injectors, each comprising a fuel feed arm and a lean burn fuel injector head with a lean burn fuel injector head tip, wherein the lean burn fuel injector head tip has a lean burn fuel injector head tip diameter (d), the lean burn fuel injector head comprising a pilot fuel injector and a main fuel injector, the main fuel injector being arranged coaxially and radially outwards of the pilot fuel injector; and a combustor chamber extending along an axial direction and comprising a radially inner annular wall, a radially outer annular wall, and a meter panel provided upstream of the radially inner and radially outer annular walls with a plurality of apertures adapted for accommodating the lean burn fuel injector head tips. The radially inner annular wall, the radially outer annular wall, and the meter panel define the size and shape of the combustor chamber, wherein the combustor chamber has a combustor chamber length (L) and comprises a primary combustion zone with a primary combustion zone length (Z) and a primary combustion zone depth (D), and a secondary combustion zone with a secondary combustion zone length (L-Z) arranged downstream of the primary combustion zone. According to the third aspect, a ratio D/d of the primary combustion zone depth to the lean burn fuel injector head tip diameter is less than 2.4.

In embodiments, the ratio D/d of the primary combustion zone depth to the lean burn fuel injector head tip diameter may be less than 2.3, for example less than 2.2, or less than 2.1, or less than 2.0.

The ratio D/d of the primary combustion zone depth D to the lean burn fuel injector head tip diameter d may be greater than 1.2. In embodiments, the ratio D/d of the primary combustion zone depth D to the lean burn fuel injector head tip diameter d may be greater than 1.3, for example greater than 1.4, or greater than 1.5.

In embodiments, a ratio L/d of the combustor chamber length L to the lean burn fuel injector head tip diameter d may be less than 5, for example less than 4.5, or less than 4, or less than 3.5, or less than 3, or less than 2.8, or less than 2.6, or less than 2.5, or less than 2.45, or less than 2.4. The ratio L/d of the combustor chamber length L to the lean burn fuel injector head tip diameter d may be greater than 1.5, for example greater than 1.7, or greater than 1.8, or greater than 1.85, or greater than 1.9, or greater than 2.0.

In embodiments, a ratio L/D of the combustor chamber length L to the primary combustion zone depth D may be less than 2.0, for example less than 1.9, or less than 1.8, or less than 1.75, or less than 1.70, or less than 1.65, or less than 1.60. The ratio L/D of the combustor chamber length L to the primary combustion zone depth D may be greater than 1.0, for example greater than 1.05, or greater than 1.10, or greater than 1.15, or greater than 1.20, or greater than 1.25.

In embodiments, a ratio Z/d of the primary combustion zone length Z to the lean burn fuel injector head tip diameter d may be less than 1.40, for example less than 1.35, or less than 1.30, or less than 1.25, or less than 1.20. The ratio Z/d of the primary combustion zone length Z to the lean burn fuel injector head tip diameter d may be greater than 0.70, for example greater than 0.75, or greater than 0.80, or greater than 0.85, or greater than 0.90.

In embodiments, the lean burn combustor of the first, second, and third aspect described above may comprise a pre-diffuser, arranged upstream of the lean burn fuel injector head and adapted for providing the combustor chamber with compressed air. In some literature, the pre-diffuser is simply referred to as diffuser. The pre-diffuser may be generally annular and may include radially inner and radially outer walls defining an outlet for the compressed air. In the present disclosure a damp gap (g) may be defined as axial distance between a mid-point between the radially inner and radially outer walls of the pre-diffuser at said outlet and a mid-point between the radially inner and radially outer annular walls of the combustor chamber at the meter panel. A ratio g/d of the damp gap g to the lean burn fuel injector head tip diameter d may be less than 1.30, for example less than 1.25, or less than 1.2, or less than 1.15. The ratio g/d of the damp gap g to the lean burn fuel injector head tip diameter d may be greater than 0.65, for example greater than 0.7, or greater than 0.75, or greater than 0.8, or greater than 0.85.

The skilled person would appreciate that also the ratio g/d of the damp gap g to the lean burn fuel injector head tip diameter d is non-dimensional and may apply to lean burn combustors, and relative combustor chambers, of a wide size range and may contribute to form the S-shaped recirculation zone within the primary combustion zone.

According to a forth aspect, there is provided a lean burn combustor comprising: a plurality of lean burn fuel injectors, each comprising a fuel feed arm and a lean burn fuel injector head with a lean burn fuel injector head tip, wherein the lean burn fuel injector head tip has a lean burn fuel injector head tip diameter (d), the lean burn fuel injector head comprising a pilot fuel injector and a main fuel injector, the main fuel injector being arranged coaxially and radially outwards of the pilot fuel injector; and a combustor chamber extending along an axial direction and comprising a radially inner annular wall, a radially outer annular wall, and a meter panel provided upstream of the radially inner and radially outer annular walls with a plurality of apertures adapted for accommodating the lean burn fuel injector head tips. The radially inner annular wall, the radially outer annular wall, and the meter panel define the size and shape of the combustor chamber. The lean burn combustor of the forth aspect further includes a pre-diffuser, arranged upstream of the lean burn fuel injector head and adapted for providing the combustor chamber with compressed air.

The pre-diffuser is generally annular and includes radially inner and radially outer walls defining an outlet for the compressed air. A damp gap (g) is defined as axial distance between a mid-point between the radially inner and radially outer walls of the pre-diffuser at said outlet and a mid-point between the radially inner and radially outer annular walls of the combustor chamber at the meter panel, wherein a ratio g/d of the damp gap to the lean burn fuel injector head tip diameter is less than 1.30.

In embodiments, the ratio g/d of the damp gap g to the lean burn fuel injector head tip diameter d may be less than 1.25, for example less than 1.2, or less than 1.15. The ratio g/d of the damp gap g to the lean burn fuel injector head tip diameter d may be greater than 0.65, for example greater than 0.7, or greater than 0.75, or greater than 0.8, or greater than 0.85.

The combustor chamber of the lean burn combustor of the forth aspect has a combustor chamber length (L) and may define a primary combustion zone with a primary combustion zone length (Z) and a primary combustion zone depth (D), and a secondary combustion zone with a secondary combustion zone length (L-Z) arranged downstream of the primary combustion zone.

In embodiments, a ratio D/d of the primary zone depth D to the lean burn fuel injector head tip diameter d may be less than 2.4, for example less than 2.3, or less than 2.2, or less than 2.1, or less than 2.0. The ratio D/d of the primary combustion zone depth D to the lean burn fuel injector head tip diameter d may be greater than 1.2, for example greater than 1.3, or greater than 1.4, or greater than 1.5.

In embodiments, a ratio L/D of the combustor chamber length L to the primary combustion zone depth D may be less than 2.0, for example less than 1.9, or less than 1.8, or less than 1.75, or less than 1.70, or less than 1.65, or less than 1.60. The ratio L/D of the combustor chamber length L to the primary combustion zone depth D may be greater than 1.0, for example greater than 1.05, or greater than 1.10, or greater than 1.15, or greater than 1.20, or greater than 1.25.

In embodiments, a ratio L/d of the combustor chamber length L to the lean burn fuel injector head tip diameter d may be less than 5, for example less than 4.5, or less than 4, or less than 3.5, or less than 3, or less than 2.8, or less than 2.6, or less than 2.5, or less than 2.45, or less than 2.4. The ratio L/d of the combustor chamber length L to the lean burn fuel injector head tip diameter d may be greater than 1.5, for example greater than 1.7, or greater than 1.8, or greater than 1.85, or greater than 1.9, or greater than 2.0.

In embodiments, a ratio Z/d of the primary combustion zone length Z to the lean burn fuel injector head tip diameter d may be less than 1.40, for example less than 1.35, or less than 1.30, or less than 1.25, or less than 1.20. The ratio Z/d of the primary combustion zone length Z to the lean burn fuel injector head tip diameter d may be greater than 0.70, for example greater than 0.75, or greater than 0.80, or greater than 0.85, or greater than 0.90.

According to a fifth aspect, there is provided a gas turbine engine comprising a lean burn combustor according to any one of the aspects described above.

The gas turbine engine of the fifth aspect may be a gas turbine engine for an aircraft, or for industrial and marine applications.

In embodiments, the gas turbine engine may further comprise: an engine core comprising a compressor, a combustor, a turbine, and a core shaft connecting the turbine to the compressor; and a fan located upstream of the engine core, the fan comprising a plurality of fan blades, wherein the combustor is the lean burn combustor according to any one of the first, second, third, and forth aspect.

In embodiments, the compressor and turbine may rotate about an engine principal rotational axis, and the axial direction of the combustor chamber may be parallel to the engine principal rotational axis.

As previously noted, the lean burn combustor according to the disclosure may be sized for engines adapted to be mounted on small, medium, and large aircrafts. Accordingly, the fan of the gas turbine engine according to the fifth aspect may have a fan diameter greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 220 cm to 420 cm, or 240 cm to 380 cm, or 240 cm to 280 cm, or 330 cm to 380 cm.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8.

According to an aspect, there is provided an aircraft comprising a gas turbine engine as described and/or claimed herein. The aircraft according to this aspect is the aircraft for which the gas turbine engine has been designed to be attached.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
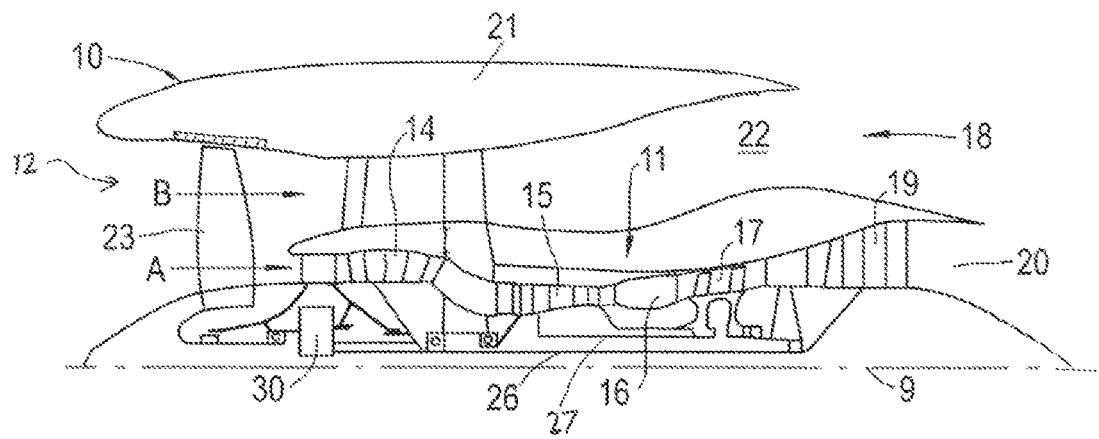
FIG. 1 is a sectional side view of a gas turbine engine.

With reference to FIG. 1, a gas turbine engine, generally indicated at 10, has an engine principal rotational axis 9. The engine 10 comprises an air intake 12 and a propulsive fan with a plurality of fan blades 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment comprising a lean burn combustor 16, a high-pressure turbine 17, a low pressure turbine 19 and a core exhaust nozzle 20. A nacelle 21 generally surrounds the gas turbine engine 10 and defines a bypass duct 22 and a bypass exhaust nozzle 18. The bypass airflow B flows through the bypass duct 22. The fan is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan generally provides the majority of the propulsive thrust. The epicyclic gearbox 30 is a reduction gearbox.

Note that the terms "low pressure turbine" and "low pressure compressor" as used herein may be taken to mean the lowest pressure turbine stages and lowest pressure compressor stages (i.e. not including the fan) respectively and/or the turbine and compressor stages that are connected together by the interconnecting shaft 26 with the lowest rotational speed in the engine (i.e. not including the gearbox output shaft that drives the fan). In some literature, the "low pressure turbine" and "low pressure compressor" referred to herein may alternatively be known as the "intermediate pressure turbine" and "intermediate pressure compressor". Where such alternative nomenclature is used, the fan may be referred to as a first, or lowest pressure, compression stage.

Other gas turbine engines to which the present disclosure may be applied may have alternative configurations. By way of example, such engines may have an alternative number of interconnecting shafts (e.g. two) and/or an alternative number of compressors and/or turbines. Further, the engine may be an ungeared engine, i.e. the engine may not comprise a gearbox provided in the drive train from the turbine to the compressor and/or fan.

Figure 2:
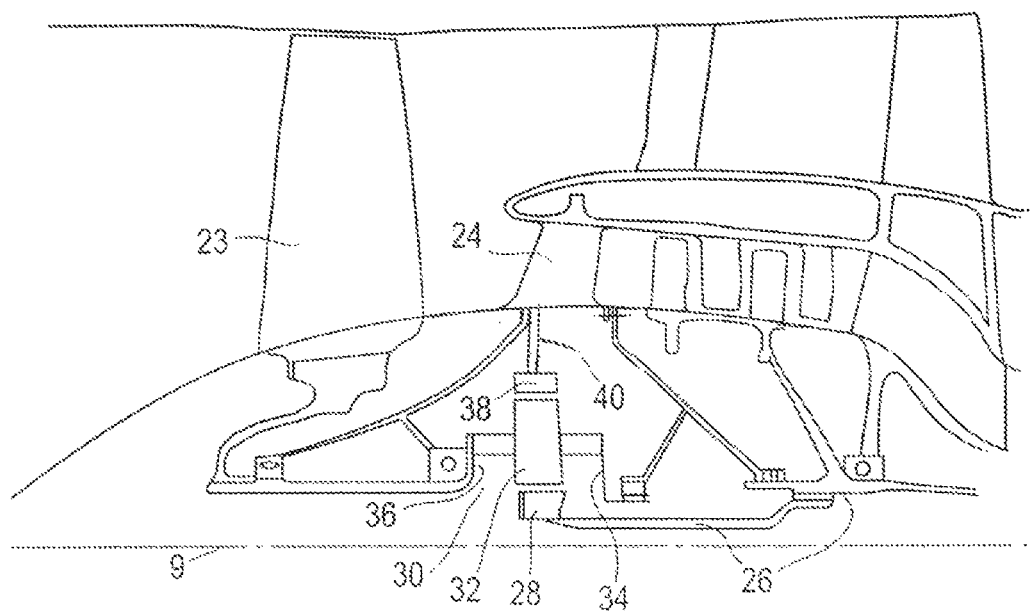
FIG. 2 is a close up sectional side view of an upstream portion of the gas turbine engine of FIG. 1.

FIG. 2 illustrates in greater detail the gearbox 30 of the gas turbine engine 10. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Figure 3:
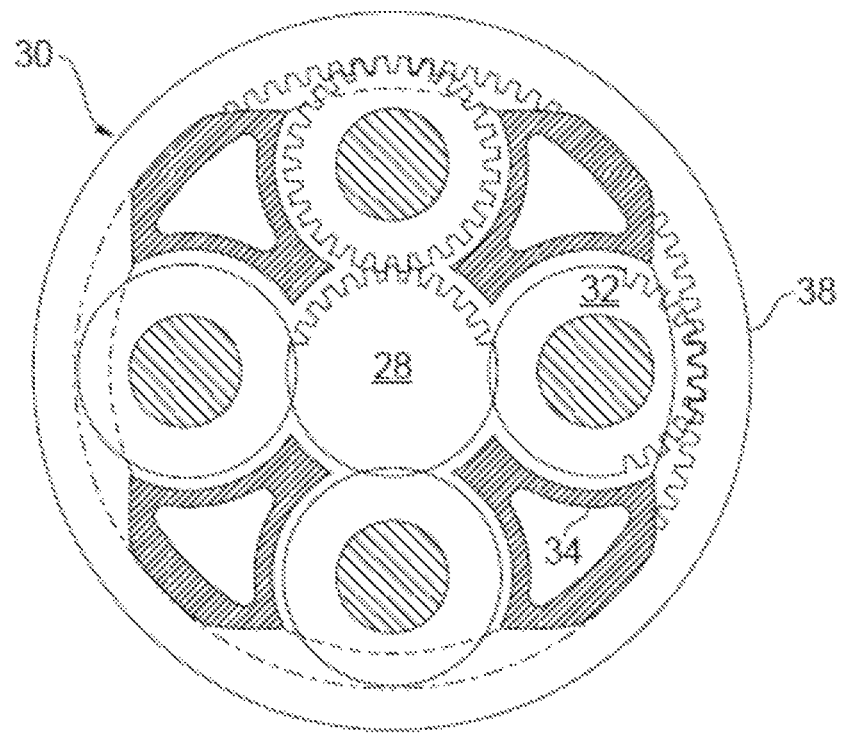
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Accordingly, the present disclosure extends to a gas turbine engine having any arrangement of gearbox styles (for example star or planetary), support structures, input and output shaft arrangement, and bearing locations.

Figure 4:
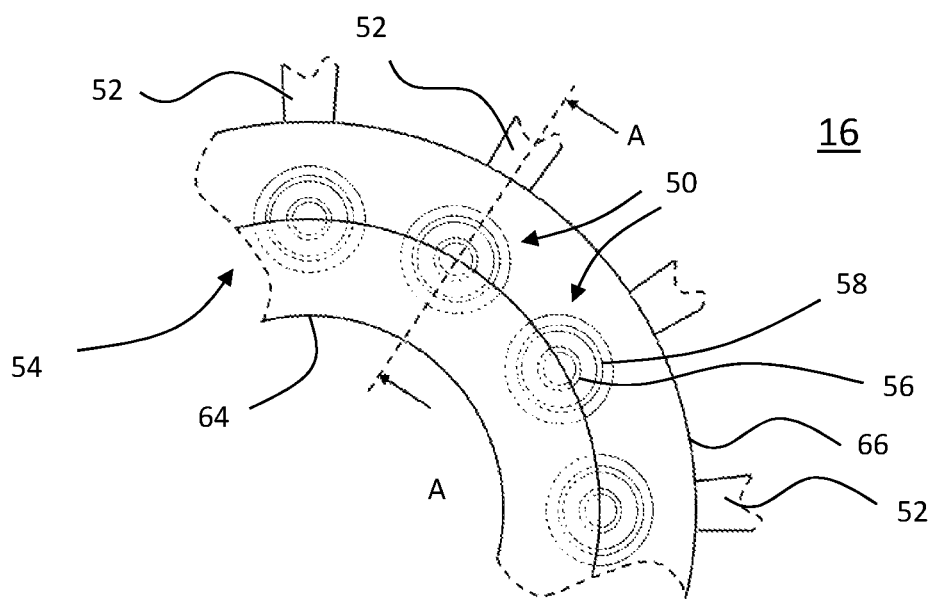
FIG. 4 is a partial rear view of a lean burn combustor according to the disclosure.
Figure 5:
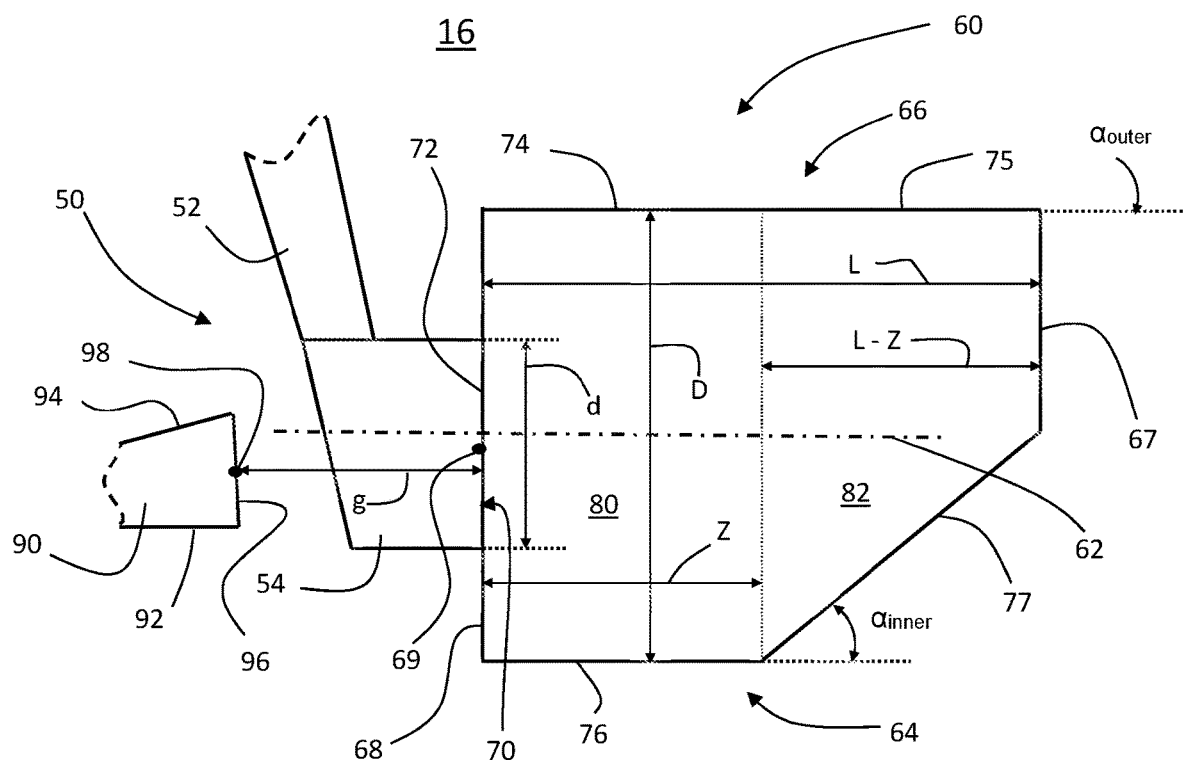
FIG. 5 is a sectional side view of the lean burn combustor of FIG. 4 along arrows A-A.

FIGS. 4 and 5 illustrate the lean burn combustor 16 in greater detail.

The lean burn combustor 16 comprises a plurality of lean burn fuel injectors 50, each comprising a fuel feed arm 52 and a lean burn fuel injector head 54. The fuel feed arm 52 delivers fuel from a distribution system (not illustrated) to the lean burn fuel injector head 54, where fuel and air are mixed.

The lean burn fuel injector head 54 comprises a pilot fuel injector 56 and a radially outer main fuel injector 58. The main fuel injector 58 is arranged coaxially around the pilot fuel injector 56. The lean burn fuel injector head 54 further comprises air swirlers (not illustrated for sake of simplicity). According to known arrangements, the lean burn fuel injector head 54 may comprise three, four, or five air swirlers adapted to provide swirling air flows which atomise the fuel from the pilot and main fuel injectors. The air swirlers may comprise swirling vanes.

For example, in a three air swirler arrangement, the pilot fuel injector is provided between inner and outer air swirlers, the main fuel injector is also provided between inner and out air swirlers, the pilot fuel injector outer air swirler being the main fuel injector inner air swirler. In a four swirler arrangement, the pilot fuel injector and the main fuel injector do not share air swirlers, such that each of the pilot fuel injector and main fuel injector comprises its own set of inner and outer air swirler. In a five swirler arrangement, an additional air swirler is provided between the outer air swirler of the pilot fuel injector and the inner air swirler of the main fuel injector.

The lean burn combustor 16 further comprises a combustor chamber 60 extending along an axial direction 62. In the illustrated embodiment, the axial direction 62 is substantially parallel to the engine principal rotational axis 9. In other non-illustrated embodiments, the axial direction 62 may not be parallel to the engine principal rotational axis 9. In other words, the combustion chambers may extend at an angle to the axial direction 62, for example at an angle comprised between 0° and 20°.

The combustor chamber 60 comprises a radially inner annular wall 64, a radially outer annular wall 66, and a meter panel 68 provided upstream of the radially inner and radially outer annular walls 64, 66. Axially opposite to the meter panel 68, the combustor chamber 60 features an annular outlet 67, through which the combusted gas exits the combustor chamber 60. The annular outlet is defined between respective downstream end portions of the radially inner annular wall 64 and the radially outer annular wall 66 of the combustor chamber 60. In other words, the combustor chamber 60 extends axially from the upstream meter plate 68 and the downstream annular outlet 67 for a length L.

The meter panel 68 is provided with a plurality of apertures 70 for accommodating the lean burn fuel injectors 50. In detail, the lean burn fuel injectors 50 are connected to the meter panel 68 at a tip 72 of the lean burn fuel injector head 54 that is coaxially housed in the aperture 70.

The lean burn fuel injector head 54 may generally extend along a longitudinal direction 55. In the illustrated embodiment, the longitudinal direction 55 is parallel to the axial direction 62. In other words, a cant angle $\alpha_{cant}$ defined between the longitudinal 55 and the axial direction 62 is 0°. In non-illustrated embodiment, the lean burn fuel injector head 54 may not be coaxial with the aperture 70, or in other words the cant angle $\alpha_{cant}$ may be different from 0°, for example comprised between 0° and 10°.

The lean burn fuel injectors 50 are configured to inject fuel and air into the combustor chamber 50. A meter panel mid-point 69 is defined at the meter panel 68 mid-way between the radially inner annular wall 64 and the radially outer annular wall 66.

The lean burn fuel injector head tip 72 features a lean burn fuel injector head tip diameter d, which corresponds to the diameter of the aperture 70.

The radially inner annular wall 64 and the radially outer annular wall 66 are connected to the meter panel 68 at their upstream end portions. The radially inner annular wall 64, radially outer annular wall 66, and meter panel 68 define with respective inner surfaces the size and shape of the combustor chamber 60.

In embodiments not illustrated, the radially inner annular wall 64, radially outer annular wall 66, and meter panel 68 may each comprise respective tiles. If present, the tiles define the respective inner surfaces of the radially inner annular wall 64, radially outer annular wall 66, and meter panel 68, and therefore the size and shape of the combustor chamber 60 where combustion occurs. The tiles, or in other words the inner surfaces of the radially inner annular wall 64, radially outer annular wall 66, and meter panel 68 face the combustion process within the combustion chamber 60 and are in contact with the fuel and air mixture and/or combustion gasses.

The radially outer annular wall 66 extends substantially axially between the meter panel 68 and the annular outlet 67. In other words, the radially outer annular wall 66 forms an outer angle $\alpha_{outer}$ with the axial direction 62 substantially equal to 0°. In non-illustrated embodiments, the radially outer annular wall 66 may extend along a direction which forms with the axial direction 62 an outer angle $\alpha_{outer}$ different from 0°, for example comprised between 0° and 15°.

The radially outer annular wall 66 comprises a first part 74 and a second part 75. The first part 74 of the radially outer annular wall 66 is arranged upstream of the second part 75 of the radially outer annular wall 66. An upstream portion of the first part 74 of the radially outer annular wall 66 is connected to the meter panel 68. A downstream end portion of the second part 75 of the radially outer annular wall 66 define the annular outlet 67 of the combustion chamber 60. In the illustrated embodiment, the first part 74 and the second part 75 of the radially outer annular wall 66 are integral and mutually aligned along the axial direction 62.

The radially inner annular wall 64 comprise a first part 76 and a second part 77. The first part 76 of the radially inner annular wall 64 is arranged upstream of the second part 77 of the radially inner annular wall 64. An upstream portion of the first part 76 of the radially inner annular wall 64 is connected to the meter panel 68. A downstream end portion of the second part 77 of the radially inner annular wall 64 along with the downstream end portion of the second part 75 of the radially outer annular wall 66 define the annular outlet 67 of the combustion chamber 60. The first part 76 of the radially inner annular wall 64 is arranged at an angle to the second part 77 of the radially inner annular wall 64. The first part 76 of the radially inner annular wall 64 is generally parallel to the axial direction 62. The first part 76 of the radially inner annular wall 64 is generally parallel to the first part 74 of the radially outer annular wall 66. The second part 75 of the radially inner annular wall 64 is convergent towards the radially outer annular wall 66 in a downstream direction to form the annular outlet 67. The second part 77 of the radially inner annular wall 64 is arranged at an angle to the first part 76 of the radially inner annular wall 64. Moreover, the second part 77 of the radially inner annular wall 64 forms an inner angle $\alpha_{inner}$ with the first part 76 of the radially inner annular wall 64. The inner angle $\alpha_{inner}$ is generally comprised between 25° and 40°. As the first part 76 of the radially inner annular wall 76 and the radially outer annular wall 74 are generally parallel to the axial direction 62, the second part 77 of the radially inner annular wall 64 is arranged at the inner angle $\alpha_{inner}$ to the axial direction 62 and to the radially outer annular wall 74.

The combustor chamber 60 comprises a primary combustion zone 80 and a secondary combustion zone 82.

The primary combustion zone 80 is defined by the first part 76 of the radially inner annular wall 64, the first part 74 of the radially outer annular wall 66, and the meter panel 68. The primary combustion zone 80 is annular in cross-section and extends axially from the meter panel 68 for a length Z. In the embodiment illustrated, both the first part 74 of the radially outer annular wall 66 and the first part 76 of the radially inner annular wall 64 extend axially for the length Z. Moreover, the primary combustion zone 80 extends radially, i.e. in a direction perpendicular to the axial direction 62, for a depth D between the first part 76 of the radially inner annular wall 64 and the first part 74 of the radially outer annular wall 66.

The secondary combustion zone 82, which is arranged downstream of the primary combustion zone 80, is defined by the second part 77 of the radially inner annular wall 64 and the second part 75 of the radially outer annular wall 66. In practice, the secondary combustion zone 82 extends from a downstream end portion of the primary combustion zone 80 to the annular outlet 67. The secondary combustion zone 82 extends axially for a length L-Z. In the embodiment described, the second part 75 of the radially outer annular wall 66 extends for the same length L-Z and the second part 77 of the radially inner annular wall 64 extends for a length equal to (L-Z)·sin $\alpha_{inner}$. The second combustion zone 82 is annular- and frusto-conical-shaped and convergent downstream towards the annular outlet 67.

The combustion chamber 60 is dimensioned such that a ratio L/d of the combustor chamber length L to the lean burn fuel injector head tip diameter d is less than 5, or less than 3, and greater than 1.5, or greater than 2.0. The ratio L/d being less than 5 and greater than 1.5, preferably less than 2.4 and greater than 2.0, allows to optimise the aerodynamics of the fuel and air mixture coming from the main and pilot fuel injectors 56, 58 and relative air swirler, and increase combustion efficiency.

Figure 6:
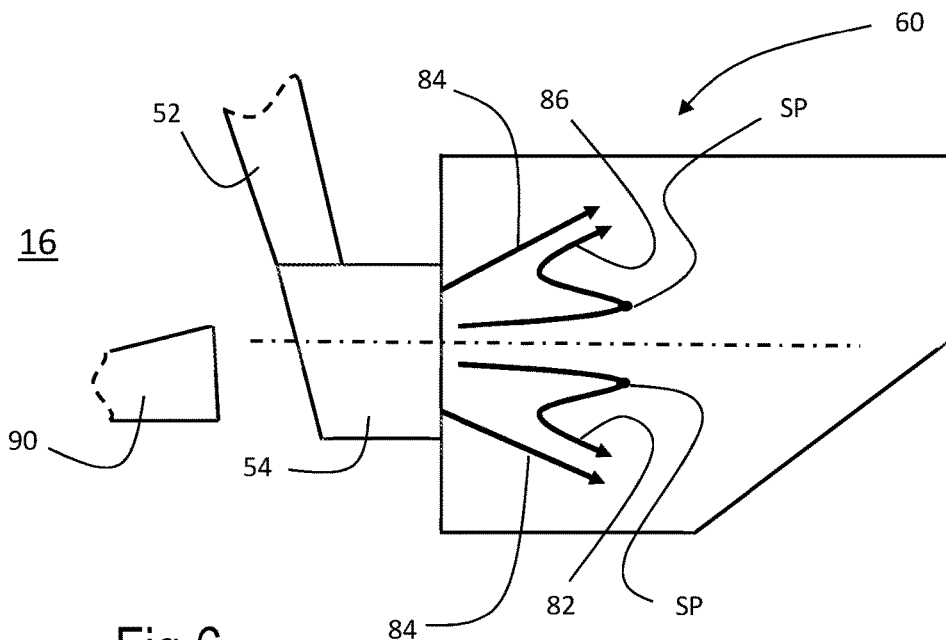
FIG. 6 is a schematic representation of an S-shaped flow recirculation in a primary combustion zone of the lean burn combustor of FIGS. 4 and 5.

This will be described in greater detail with reference to FIG. 6.

The pilot fuel and air mixture travels along a so-called S-shaped trajectory 86 within the primary combustion zone 80. The pilot fuel and air mixture coming from the lean burn fuel injector head tip 72 arrives at a stagnation point SP where the pilot fuel and air mixture local velocity is zero, and is then diverted backwards towards the radially outer and radially inner annular wall 74, 76 (due to low static pressure exerted by the main fuel and air mixture 84) where the pilot fuel and air mixture enters in contact and supports/stabilises the combustion of the main fuel and air mixture 84.

The ratio L/d being less than 5 and greater than 1.5, preferably between 2.0 and 2.4, allows to achieve the S-shaped flow recirculation of the pilot fuel and air mixture within the primary combustion zone 80. In other words, the pilot fuel and air mixture stagnation point SP is within the primary combustion zone 80 and the pilot fuel and air mixture mixes with the fuel main and air mixture 84 within the primary combustion zone 80.

Other non-dimensional parameter may have a positive effect on the formation of the pilot fuel and air mixture S-shaped trajectory 86 within the primary combustion zone 80.

The combustion chamber 60 may be dimensioned such that a ratio L/D of the combustor chamber length L to the primary combustion zone depth D is less than 2.0, for example less 1.60, and greater than 1.0, for example greater than 1.25. In an embodiment, the combustor chamber 60 may have a ratio L/D of 1.5.

Moreover, the combustion chamber 60 may be dimensioned such that the ratio D/d of the primary combustion zone depth D to the lean burn fuel injector head tip diameter d is comprised between 1.2 and 2.4, preferably between 2.0 and 2.4. In an embodiment, the combustor chamber 60 may have a ratio D/d of 2.2.

Furthermore, the combustion chamber 60 may be dimensioned such that a ratio Z/d of the primary combustion zone length L to the lean burn fuel injector head tip diameter d is greater than 0.70 and less than 1.40, preferably comprised between 0.9 and 1.25. In an embodiment, the combustor chamber 60 may have a ratio Z/d of 1.05.

The above ratios (L/D, D/d, and Z/d) may contribute to optimise the aerodynamics of the fuel and air mixture coming from the main and pilot fuel injectors 56, 58 and relative air swirler, and increase combustion efficiency.

It should be noted that all of the above ratios (L/d, L/D, D/d, and Z/d) are non-dimensional and therefore apply to lean burn combustors of a wide size range. For example, D may be comprised between 90 mm and 150 mm, for example between 110 mm and 140 mm, d may be comprised between 60 mm and 100 mm, for example between 70 mm and 85 mm, Z may be comprised between 50 mm and 130 mm, for example between 60 mm and 110 mm, and L may be comprised between 100 mm and 200 mm.

The lean burn combustor 16 further comprises a pre-diffuser 90 for providing the lean burn fuel injector head 54 with compressed air from the high-pressure compressor 15. The pre-diffuser is annular and includes a radially inner wall 92 and a radially outer wall 94 that define an outlet 96 for the compressed air. An outlet pre-diffuser mid-point 98 is defined mid-way between the radially inner wall 92 and the radially outer wall 94 at the outlet 96.

The pre-diffuser 90 is arranged upstream of the lean burn fuel injector head 54 at a distance g (damp gap) from the meter panel 68. The damp gap g is defined as axial distance between the outlet pre-diffuser mid-point 98 and the meter panel mid-point 69. The pre-diffuser 90 is distanced from the combustor chamber 60 such that the ratio g/d of the damp gap g to the lean burn fuel injector head tip diameter d may be less than 1.30, for example less than 1.15, and greater than 0.65, for example greater than 0.85. In an embodiment, the combustor chamber 60 may have a ratio g/d of 1.05.

Arranging the pre-diffuser 90 at a distance to the meter panel 68 such that the ratio g/d of the damp gap g to the lean burn fuel injector head tip diameter d may be less than 1.30 and greater than 0.65 may further improve the aerodynamics of the pilot and main fuel and air mixture within the combustor chamber 60, and in particular within the primary combustion zone 80.

Although the present disclosure has been described with reference to a turbofan gas turbine engine it is equally possible to use the present disclosure on a turbo-jet gas turbine engine, a turbo-shaft gas turbine engine or a turbo-prop gas turbine engine. Although the present disclosure has been described with reference to an aero gas turbine engine it is equally possible to use the present disclosure on a marine gas turbine engine, or an industrial gas turbine engine.

We claim:

1. A lean burn combustor comprising:
a plurality of lean burn fuel injectors, each comprising a fuel feed arm and a lean burn fuel injector head with a lean burn fuel injector head tip, wherein the lean burn fuel injector head tip has a lean burn fuel injector head tip diameter, the lean burn fuel injector head comprising a pilot fuel injector and a main fuel injector, the main fuel injector being arranged coaxially and radially outwards of the pilot fuel injector; and
a combustor chamber extending along an axial direction and comprising a radially inner annular wall, a radially outer annular wall, and a meter panel provided upstream of the radially inner and radially outer annular walls with a plurality of apertures adapted for accommodating the lean burn fuel injector head tips, the radially inner annular wall, the radially outer annular wall, and the meter panel defining the size and shape of the combustor chamber, wherein the combustor chamber has a combustor chamber length and comprises a primary combustion zone with a primary combustion zone length and a primary combustion zone depth, and a secondary combustion zone with a secondary combustion zone length arranged downstream of the primary combustion zone;
wherein a ratio of the combustor chamber length to the lean burn fuel injector head tip diameter is less than 5.

2. The lean burn combustor of claim 1, wherein the ratio of the combustor chamber length to the lean burn fuel injector head tip diameter is less than 3.

3. The lean burn combustor of claim 1, wherein the ratio of the combustor chamber length to the lean burn fuel injector head tip diameter is greater than 1.5.

4. The lean burn combustor of claim 1, wherein a ratio of the combustor chamber length to the primary combustion zone depth is less than 2.0.

5. The lean burn combustor of claim 1, wherein the ratio of the combustor chamber length to the primary combustion zone depth is greater than 1.0.

6. The lean burn combustor of claim 1, wherein a ratio of the primary combustion zone depth to the lean burn fuel injector head tip diameter is less than 2.4.

7. The lean burn combustor of claim 1, wherein a ratio of the primary combustion zone depth to the lean burn fuel injector head tip diameter is greater than 1.2.

8. The lean burn combustor of claim 1, wherein a ratio of the primary combustion zone length to the lean burn fuel injector head tip diameter is less than 1.40.

9. The lean burn combustor of claim 1, wherein a ratio of the primary combustion zone length to the lean burn fuel injector head tip diameter is greater than 0.70.

10. The lean burn combustor of claim 1, further comprising a pre-diffuser, arranged upstream of the lean burn fuel injector head and adapted for providing the combustor chamber with compressed air, the pre-diffuser being generally annular and including radially inner and radially outer walls defining an outlet, a damp gap being defined as axial distance between a mid-point between the radially inner and radially outer walls of the pre-diffuser at said outlet and a mid-point between the radially inner and radially outer annular walls of the combustor chamber at the meter panel, wherein a ratio between the damp gap and the lean burn fuel injector head tip diameter is less than 1.3.

11. The lean burn combustor of claim 10, wherein the ratio between the damp gap and the lean burn fuel injector head tip diameter is greater than 0.65.

12. The lean burn combustor of claim 1, wherein the radially outer annular wall of the combustor chamber forms an outer angle $\alpha_{outer}$ with the axial direction, the outer angle $\alpha_{outer}$ being comprised between 0° and 15°.

13. The lean burn combustor of claim 1, wherein the radially inner annular wall of the combustor chamber comprises a first part and a second part, the second part forming an inner angle $\alpha_{inner}$ with the first part, the inner angle $\alpha_{inner}$ being comprised between 15° and 50°.

14. The lean burn combustor of claim 1, wherein the lean burn fuel injector head generally extends along a longitudinal direction, the longitudinal direction forming a cant angle $\alpha_{cant}$ with the axial direction, the cant angle $\alpha_{cant}$ being comprised between 0° and 10°.

15. The lean burn combustor of claim 1, wherein the radially inner annular wall, radially outer annular wall, and meter panel are each provided with respective tiles, said tiles defining respective inner surfaces of the radially inner annular wall, radially outer annular wall, and meter panel.

16. A gas turbine engine comprising a lean burn combustor,
wherein the lean burn combustor comprises:
a plurality of lean burn fuel injectors, each comprising a fuel feed arm and a lean burn fuel injector head with a lean burn fuel injector head tip, wherein the lean burn fuel injector head tip has a lean burn fuel injector head tip diameter, the lean burn fuel injector head comprising a pilot fuel injector and a main fuel injector, the main fuel injector being arranged coaxially and radially outwards of the pilot fuel injector; and a combustor chamber extending along an axial direction and comprising a radially inner annular wall, a radially outer annular wall, and a meter panel provided upstream of the radially inner and radially outer annular walls with a plurality of apertures adapted for accommodating the lean burn fuel injector head tips, the radially inner annular wall, the radially outer annular wall, and the meter panel defining the size and shape of the combustor chamber, wherein the combustor chamber has a combustor chamber length and comprises a primary combustion zone with a primary combustion zone length and a primary combustion zone depth, and a secondary combustion zone with a secondary combustion zone length arranged downstream of the primary combustion zone;

wherein a ratio of the combustor chamber length to the lean burn fuel injector head tip diameter is less than 5.

17. The gas turbine engine of claim 16, further comprising:

an engine core comprising a compressor, a combustor, a turbine, and a core shaft connecting the turbine to the compressor, a fan located upstream of the engine core, the fan comprising a plurality of fan blades, wherein the combustor is the lean burn combustor according to claim 16.

18. The gas turbine engine of claim 17, wherein the compressor and turbine rotates about an engine main rotational axis, the axial direction of the combustor chamber being parallel to the engine main rotational axis.

19. The gas turbine engine of claim 17, further comprising a pre-diffuser, arranged upstream of the lean burn fuel injector head and adapted for providing the combustor chamber with compressed air from the compressor, the pre-diffuser being generally annular and including radially inner and radially outer walls defining an outlet, a damp gap being defined as axial distance between a mid-point between the radially inner and radially outer walls of the pre-diffuser at said outlet and a mid-point between the radially inner and radially outer annular walls of the combustor chamber at the meter panel, wherein a ratio g/d between the damp gap and the lean burn fuel injector head tip diameter is less than 1.3.

20. The gas turbine engine of claim 17, further comprising a gearbox that receives an input from the core shaft and outputs drive to the fan so as to drive the fan at a lower rotational speed than the core shaft, wherein the gearbox has a reduction ratio in the range of from 3 to 4.2.

* * * * *